United States Patent
Herring et al.

(10) Patent No.: US 10,672,051 B2
(45) Date of Patent: ***Jun. 2, 2020

(54) METHOD, COMPUTER PROGRAM PRODUCT, AND SYSTEM FOR PROVIDING A SENSOR-BASED ENVIRONMENT

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Adrian Xavier Rodriguez, Durham, NC (US); Ankit Singh, Apex, NC (US); Jeffrey John Smith, Raleigh, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,610

(22) Filed: Jan. 7, 2019

(65) Prior Publication Data
US 2019/0139375 A1 May 9, 2019

Related U.S. Application Data

(63) Continuation of application No. 14/674,776, filed on Mar. 31, 2015, now Pat. No. 10,176,677.
(Continued)

(51) Int. Cl.
*G06Q 30/00* (2012.01)
*G06Q 30/06* (2012.01)
(Continued)

(52) U.S. Cl.
CPC ........... *G06Q 30/0623* (2013.01); *G06K 9/78* (2013.01); *G06Q 10/087* (2013.01);
(Continued)

(58) Field of Classification Search
None
See application file for complete search history.

(56) References Cited

U.S. PATENT DOCUMENTS

| 5,497,314 A | 3/1996 | Novak |
| 6,592,033 B2 | 7/2003 | Jennings et al. |

(Continued)

FOREIGN PATENT DOCUMENTS

| WO | 2013134865 A1 | 9/2013 |
| WO | 20130173701 A1 | 11/2013 |

OTHER PUBLICATIONS

Schmeing, Tobias, Knowledge-based Dynamic Packaging Model, Dec. 26, 2006, Management of Innovation and Technology, 2006 IEEE International Conference, pp. 1085-1089 (Year: 2006).*

(Continued)

*Primary Examiner* — Michael Misiaszek
*Assistant Examiner* — Timothy J Kang
(74) *Attorney, Agent, or Firm* — Patterson + Sheridan, LLP

(57) ABSTRACT

Method, computer program product, and system to facilitate an audit of a checkout transaction, where the checkout transaction is associated with a virtual transaction record reflecting interactions of a person with a first set of one or more items of a plurality of items within an environment. The method includes acquiring image information including a shopping receptacle associated with the checkout transaction, and identifying a second set of one or more items of the plurality of items that are included in the shopping receptacle using the acquired image information. The method further includes comparing the first and second sets of items, and determining, based on the comparison, whether to perform an audit of the checkout transaction.

20 Claims, 9 Drawing Sheets

Related U.S. Application Data

(60) Provisional application No. 62/064,323, filed on Oct. 15, 2014.

(51) Int. Cl.

| | | |
|---|---|---|
| G07G 1/00 | (2006.01) |
| G06Q 20/20 | (2012.01) |
| G06Q 10/08 | (2012.01) |
| G06Q 20/32 | (2012.01) |
| G06Q 30/02 | (2012.01) |
| G06K 9/78 | (2006.01) |
| G01G 19/40 | (2006.01) |

(52) U.S. Cl.
CPC ......... *G06Q 20/208* (2013.01); *G06Q 20/209* (2013.01); *G06Q 20/322* (2013.01); *G06Q 30/0224* (2013.01); *G06Q 30/0269* (2013.01); *G06Q 30/0609* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G07G 1/0045* (2013.01); *G07G 1/0054* (2013.01); *G07G 1/0072* (2013.01); *G01G 19/40* (2013.01); *G06T 2207/30232* (2013.01)

(56) References Cited

U.S. PATENT DOCUMENTS

| | | |
|---|---|---|
| 6,672,506 B2 | 1/2004 | Swartz et al. |
| 7,337,960 B2 | 3/2008 | Ostrowski et al. |
| 7,648,068 B2 | 1/2010 | Silverbrook et al. |
| 7,672,876 B2 | 3/2010 | Bonner et al. |
| 7,679,522 B2 | 3/2010 | Carpenter |
| 7,965,184 B1 | 6/2011 | Nichols et al. |
| 8,104,680 B2 | 1/2012 | Kundu et al. |
| 8,571,298 B2 | 10/2013 | McQueen et al. |
| 10,176,677 B2 * | 1/2019 | Herring .............. G01G 19/4144 |
| 2005/0017071 A1 | 1/2005 | Noonan |
| 2006/0287995 A1 | 12/2006 | Quince |
| 2009/0125406 A1 | 5/2009 | Lewis et al. |
| 2012/0290288 A1 | 11/2012 | Ait-Mokhtar |
| 2012/0320199 A1 | 12/2012 | Kundu et al. |
| 2013/0048722 A1 | 2/2013 | Davis et al. |
| 2013/0311324 A1 | 11/2013 | Stoll et al. |
| 2014/0125800 A1 | 5/2014 | Van Nest et al. |
| 2014/0209687 A1 | 7/2014 | Cancro et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0095189 A1 | 4/2015 | Dharssi et al. |
| 2015/0371199 A1 | 12/2015 | Ezell |
| 2016/0110786 A1 | 4/2016 | Herring et al. |

OTHER PUBLICATIONS

Park, Unsang, Cart Auditor: A Compliance and Training Tool for Cashiers at Checkout, Nov. 1, 2010, 2010 Fourth Pacific-Rim Symposium on Image and Video Technology, pp. 151-155 (Year: 2010).

* cited by examiner

METHOD, COMPUTER PROGRAM PRODUCT, AND SYSTEM FOR PROVIDING A SENSOR-BASED ENVIRONMENT

CROSS-REFERENCE TO RELATED APPLICATIONS

This application is a continuation of co-pending U.S. patent application Ser. No. 14/674,776, filed Mar. 31, 2015 and entitled "Method, Computer Program Product, and System for Providing a Sensor-Based Environment", which claims benefit of U.S. provisional patent application Ser. No. 62/064,323, filed Oct. 15, 2014 and entitled "Integrated Shopping Environment". Each of these applications is incorporated by reference in its entirety.

BACKGROUND

The present disclosure relates to a sensor-based environment, and more specifically, to providing techniques for facilitating audits of checkout transactions in the environment using virtual transaction records.

Figure 1:
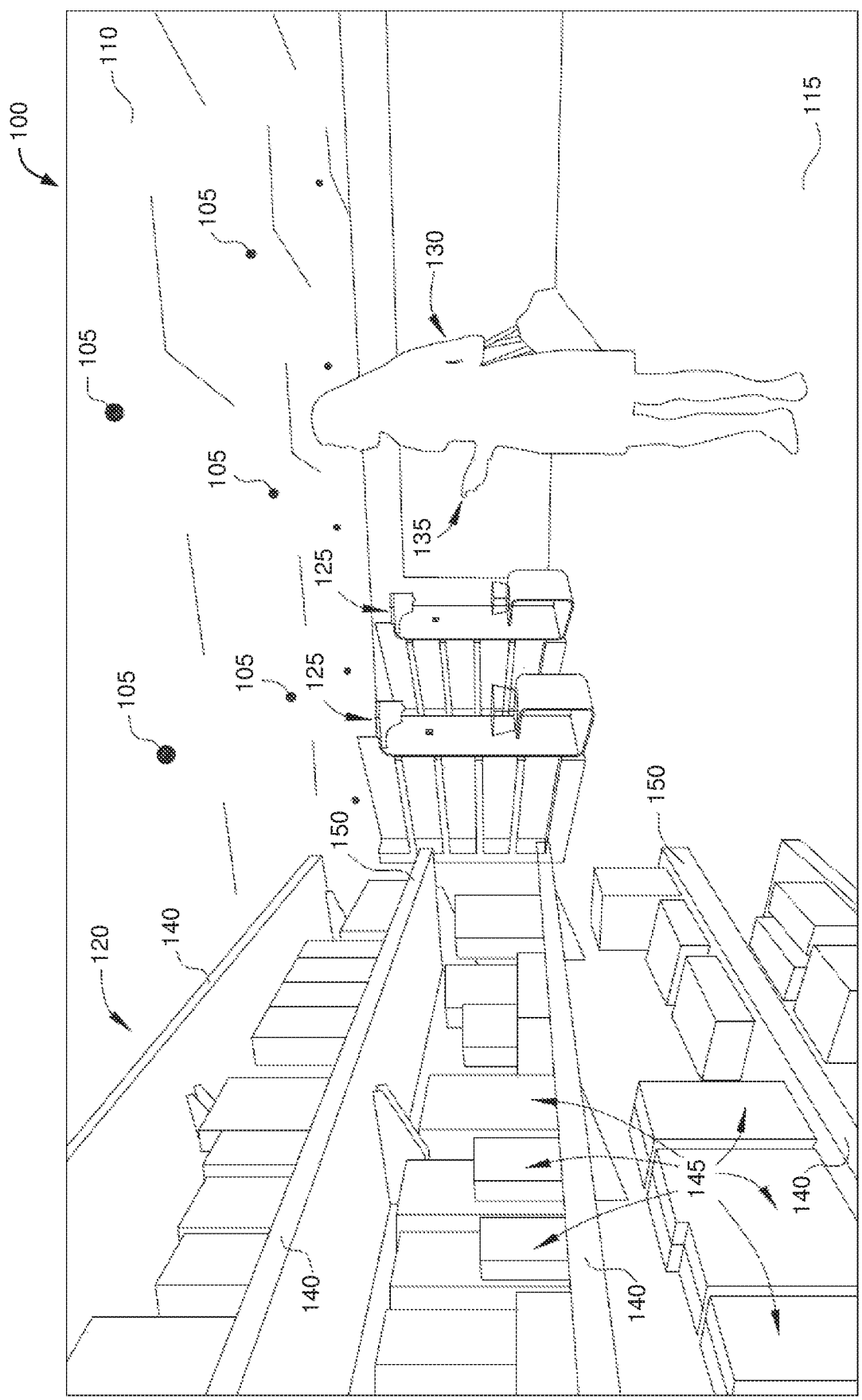
FIG. 1 illustrates an exemplary environment including a plurality of items, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and adaptive experience for a person within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

Using a system having one or more visual sensors within the environment, a retailer or other provider may acquire and process environmental data to maintain a virtual transaction record reflecting a person's interactions with various items in the environment. The virtual transaction record may include an updated listing of items (i.e., including a first item set) that have been selected by a person for presentation during a subsequent checkout transaction, which may be indicated by placing the items within a shopping receptacle. Additionally, image information including the shopping receptacle may be acquired at various locations within the environment, and image processing performed to identify second set(s) of items within the shopping receptacle at different points in time.

Acquiring the image information and determining the item sets helps to streamline or facilitate checkout transactions. Audit logic may be applied to the acquired image information and item sets to adaptively determine the level of review or scrutiny that will be applied to the person's checkout transaction. The audit logic may implement rigid legal and/or corporate requirements, as well as any loss-prevention or security considerations that may be tailored to the circumstances. In some embodiments, the audit logic may determine whether an audit should be performed on a given checkout transaction, as well as the scope of the audit. Audits generally include actions of varying degrees of intrusiveness, to be performed by the person (e.g., a customer) or by another, such as an employee.

The application of adaptive audit logic may reduce the time required for a person to perform their checkout transaction, improving their overall experience and minimizing disruptions. The reduced time also increases the collective throughput at the checkout area and/or checkout terminals. In some cases, the adaptive audit logic may enable a completely "touchless" checkout transaction, with the person completing the checkout transaction simply by departing the environment, without being required to stop at a checkout terminal or in the checkout area. While generally discussed within the context of a shopping environment, such as a retail store, it is contemplated that the techniques disclosed herein may be applied to other environments (some non-limiting examples include libraries, museums, classrooms, hospitals, etc.) to provide an similar experience for persons included therein.

FIG. 1 illustrates an exemplary environment including a plurality of items, according to one embodiment. The environment 100 includes a plurality of sensor modules 105 disposed in the ceiling 110 of the environment. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment, and so forth.

Environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees. In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

Environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach one of the terminals 125 or a designated checkout area to perform a checkout transaction.

In some cases, the checkout transaction may have "touchless" aspects or may be entirely touchless. For example, visual sensors included in the environment and/or within the approached terminal 125 may acquire image information that is usable to identify the person, items within the shopping receptacle, etc. and that streamlines or otherwise facilitates the checkout transaction. As will be discussed further herein, logic may be applied to the acquired image information to determine a level of review or scrutiny to be applied to a person's checkout transaction. Generally, the logic may reflect legal and/or corporate requirements (e.g., reviewing attempted purchases of restricted items, such as tobacco or alcohol products) as well as loss-prevention or other security considerations. In some embodiments, the logic may determine whether an audit should be performed on the checkout transaction, as well as the scope of the audit. Audits may include actions of varying degrees of intrusiveness—some non-limiting examples include prompting the person (i.e., a customer) to scan or otherwise manipulate an unidentified item, prompting the person to answer a question or provide additional information, prompting the person to manually scan each item included in their shopping receptacle, prompting an employee to locate particular items of the checkout transaction, prompting the employee to perform a full review of the checkout transaction, and so forth. In some instances, the logic may determine that an audit is not required for the checkout transaction, based on the acquired image information and/or other information such as a trust level associated with the person.

It may be important to determine an appropriate balance for whether to audit checkout transactions while still meeting legal or other requirements. Specifically, not performing an audit of a checkout transaction can help to streamline the checkout process. For example, the person may spend a shorter time completing their checkout transaction, which can improve their overall transaction experience by minimizing the disruptions to the person's transaction. Reducing time for checkout transactions also increases the collective throughput at the checkout area. In some cases, the person may be able to complete a checkout transaction simply as part of departing the environment, without requiring the person to stop at a checkout terminal or in the checkout area. In some cases, the person's time in the checkout area may be significantly reduced, such as only a momentary pause at a checkout terminal.

Figure 2:
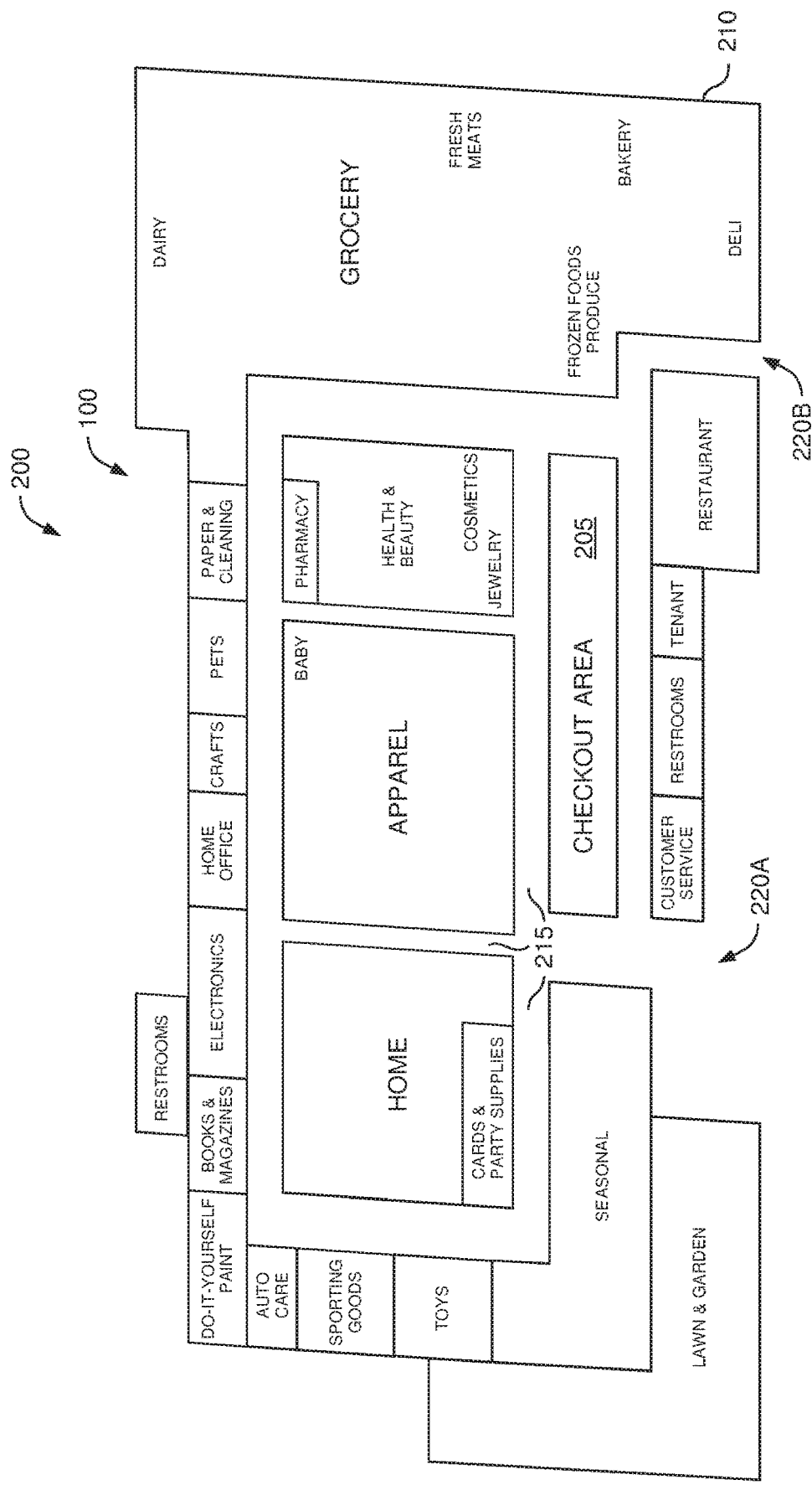
FIG. 2 illustrates an exemplary layout of an environment, according to one embodiment.

FIG. 2 illustrates an exemplary layout of an environment, according to one embodiment. Specifically, FIG. 2 depicts a projection of an exemplary floor plan 200 for the environment 100. The floor plan 200 includes areas corresponding to different departments, each of which includes a number of items available for selection and purchase. The departments (no reference numbers) are labeled with the corresponding name (e.g., "Home," "Apparel," "Seasonal," etc.). Departments, such as grocery department 210, may be further subdivided into sub-departments (e.g., "Dairy," "Fresh Meats," etc.). Although not depicted, each department may include a number of shelving units or other structure that is suitable for storing, containing, and/or displaying items. The departments may be separated by one or more pathways 215, along which a person may travel to beneficially avoid navigating through certain departments.

During an exemplary transaction, a person (e.g., a customer of the environment 100) may enter any number of departments and interact with various items included therein. Some examples of interactions include viewing items, handling items, selecting items for purchase, adding items to a shopping receptacle, and so forth. Upon completion of the transaction, the person may transport selected items to a designated checkout area 205 having one or more checkout terminals or stations. The checkout area 205 may be disposed near points of entry into and/or exit from the environment, such as entrances/exits 220A, 220B. Checkout terminals within checkout area 205 may be manned (e.g., POS terminals) or unmanned (e.g., self-checkout terminals). A number of employees may also be assigned within or adjacent to the checkout area 205 and perform audits of checkout transactions. In one example, an employee may be stationed near an exit (e.g., entrance/exit 220A or 220B) and check printed receipts following customers' checkout transactions. In another example, employees may be directed to particular checkout terminals to perform an audit during the checkout transaction, which may include interacting with the customer.

Figure 3:
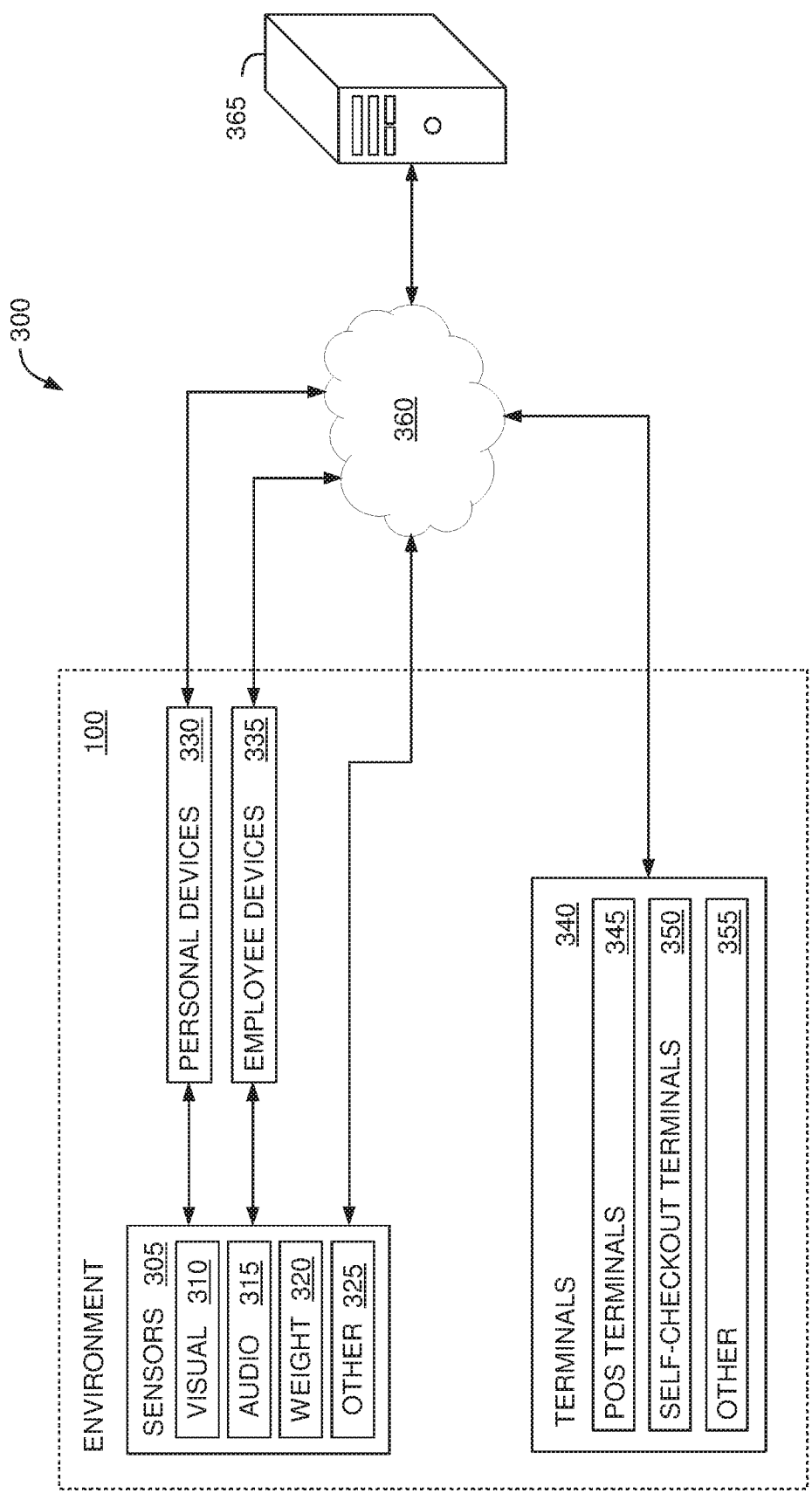
FIG. 3 illustrates an exemplary system to facilitate an audit of a checkout transaction within an environment, according to one embodiment.

FIG. 3 illustrates an exemplary system to facilitate an audit of a checkout transaction within an environment, according to one embodiment. The system 300 includes a number of components that are disposed within the environment 100. The system may also include components that are outside the environment—for example, a server 365 may be located remotely or proximately disposed to the environment (such as within a back room in the same building that is not accessible by customers).

Components within the environment include one or more sensors 305 of various types, such as visual sensors 310, audio sensors 315, and weight sensors 320. The sensors 305 may also include other sensors 325 capable of providing meaningful information about personal interactions within the environment, e.g., location sensors. The sensors 305 may be discrete sensor devices deployed throughout the environment 100 in fixed and/or movable locations. Sensors 305 may be statically included in walls, floors, ceilings, displays, or other non-sensor devices, or may be included in shopping receptacles capable of being transported through the environment. For example, weight sensors 320 may be disposed in fixed locations within the environment, such as within the floor or within a surface of a checkout terminal, and may also include load cells or other sensors disposed in a basket portion of a shopping receptacle. In one embodiment, sensors 305 may include adjustable-position sensor devices, such as motorized cameras (i.e., an example of visual sensors 310) attached to a rail, wire, or frame. In one embodiment, sensors 305 may be included on one or more unmanned vehicles configured to travel through some or all of the environment 100, such as unmanned ground vehicles (UGVs) or unmanned aerial vehicles (UAVs or "drones"). Sensors 305 may also include sensor devices that are included in computing devices associated with the environment 100, such as personal devices 330, employee devices 335, and terminals 340. In some cases, the computing devices (or the component sensor devices) may be implemented as body-worn or carried devices.

Personal devices 330 and employee devices 335 may each include passive or actively-powered devices capable of communicating with at least one of the networked devices of system 300. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 330 generally denotes ownership or possession of the devices by customers within the environment 100, while the employee devices 335 denotes ownership or possession by the retailer or other administrator of the environment 100. In some cases, employee devices 335 may be carried by employees and used in the course of their employment. Personal devices 330 and employee devices 335 may execute applications or other program code that generally enables various functions and features accessible using server 365 and/or other networked computing devices. In some embodiments, sensor devices that are included with the personal devices 330 or employee devices 335 may be included in the sensors 305.

System 300 includes a plurality of terminals 340 within the environment 100. Terminals 340 generally include any structure that is capable of receiving input from and/or producing output to people (e.g., customers, employees) within the environment 100. The terminals 340 may include computing systems, portions of computing systems, or devices controllable by computing systems. In one example, a terminal 340 may include a computing device that is communicatively coupled with a visual display and audio speaker(s), as well as being communicatively coupled with one or more input devices. In another example, a terminal 340 may include a visual display and associated driver hardware, but a computing device coupled to the terminal and providing data for display is disposed separately from the terminal. In some embodiments, terminals 340 may be implemented as standalone devices, such as a kiosk disposed on the store floor or monolithic device disposed on a shelf or platform. In some embodiments, terminals 340 may be integrated partially or wholly with other components of the environment 100, such as input or output devices included with shelving or other structural components in the environment (e.g., components used for product display or storage). In some embodiments, terminals 340 may be modular and may be easily attachable and detachable to elements of the environment 100, such as the structural components.

Generally, terminals 340 may be distributed throughout the environment 100 and may enhance various phases of the person's transactions within the environment. For example, terminals 340 may include digital signage (i.e., included as an example of other terminals 355) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 340 may also include one or more types of terminals usable for completing checkout transactions, such as employee-manned POS terminals 345 and self-checkout terminals 350. In some cases, the terminals 340 that provide checkout functionality may be disposed within a designated checkout area within the environment 100.

In some embodiments, terminals 340 may provide an integrated functionality. For example, terminals 340 may function in a first mode as digital signage, and when engaged by a person (i.e., receiving input from the person), the terminals function in a second mode as a self-checkout terminal or other type of terminal.

Server 365 generally includes processor(s), memory, and communications capabilities and may perform various computing tasks to support the operation of the environment 100.

Server 365 may communicate using various wired and/or wireless communications methods with terminals 340, sensors 305, and with other networked devices such as personal devices 330 and employee devices 335. Server 365 generally executes computer program code in which input data is received from networked devices, the input data is processed and/or stored by the servers, and output data is provided to networked devices for operation of the environment 100.

Network 360 may include one or more networks of various types, including a local area or local access network (LAN), a general wide area network (WAN), and/or a public network (e.g., the Internet). In one embodiment, various networked computing devices of the system 300 are interconnected using a LAN, and one or more computing devices (e.g., server 365, personal devices 330) include connections to the Internet.

Figure 4:
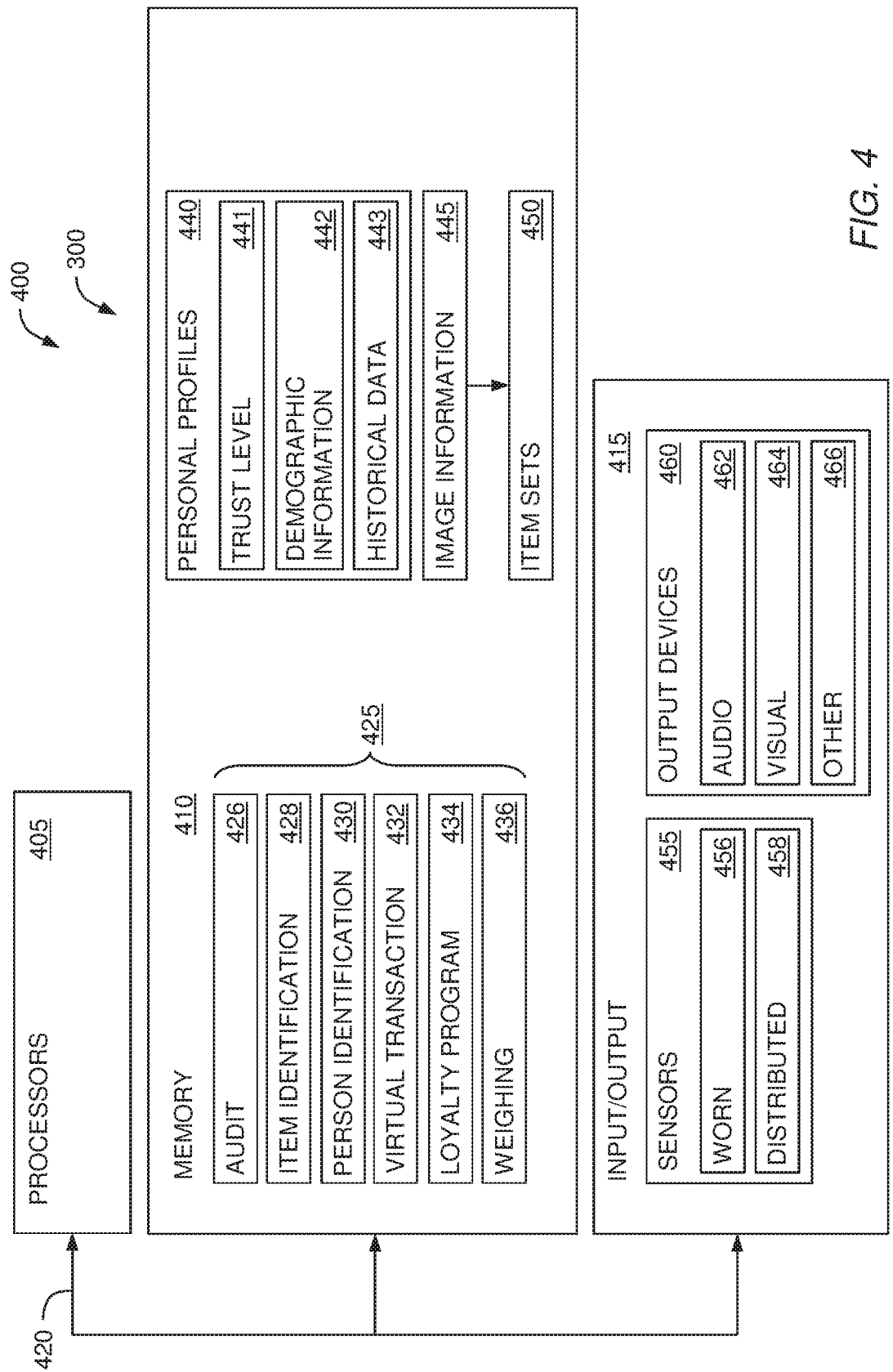
FIG. 4 is a block diagram illustrating operation of a system to facilitate an audit of a checkout transaction within an environment, according to one embodiment.

FIG. 4 is a block diagram illustrating operation of a system to facilitate an audit of a checkout transaction within an environment, according to one embodiment. Specifically, the arrangement 400 illustrates operation of the system 300. Arrangement 400 includes a number of processors 405, memory 410, and input/output 415, which are interconnected using one or more connections 420. In one embodiment, the arrangement 400 may be implemented as a singular computing device and connection 420 may represent a common bus. In other embodiments, arrangement 400 is distributed and includes a plurality of discrete computing devices that are connected through wired or wireless networking. The processors 405 may include any processing element suitable for performing functions described herein, and may include single or multiple core processors, as well as combinations thereof. Processors 405 may be included in a single computing device, or may represent an aggregation of processing elements included across a number of networked devices such as personal devices 330, terminals 340, etc.

Memory 410 may include a variety of computer-readable media selected for their size, relative performance, or other capabilities: volatile and/or non-volatile media, removable and/or non-removable media, etc. Memory 410 may include cache, random access memory (RAM), storage, etc. Storage included as part of memory 410 may typically provide a non-volatile memory for the networked computing devices (e.g., server 365), and may include one or more different storage elements such as Flash memory, a hard disk drive, a solid state drive, an optical storage device, and/or a magnetic storage device. Memory 410 may be included in a single computing device or may represent an aggregation of memory included in networked devices. Memory 410 may include a plurality of modules 425 for performing various functions described herein. The modules 425 generally include program code that is executable by one or more of the processors 405. As shown, modules 425 include audit 426, item identification 428, person identification 430, virtual transaction 432, loyalty program 434, and weighing 436. The modules 425 may also interact to perform certain functions. For example, a loyalty program 434 during operation may make calls to item identification module 428, person identification module 430, and so forth. The person of ordinary skill will recognize that the modules provided here are merely non-exclusive examples; different functions and/or groupings of functions may be included as desired to suitably operate the environment. Memory 410 may also include personal profiles 440 and image information 445, which may be accessed and/or modified by various of the modules 425. In one embodiment, the personal profiles 440 and image information 445 may be stored on the server 365 or on a separate database.

Input/output (I/O) 415 includes sensors 455, which includes the various sensors 305 of FIG. 3. Sensors 455 may be subdivided into worn (or carried) sensors 456 that are worn or carried by persons within the environment, and distributed sensors 458 that are disposed at fixed or movable locations within the environment. I/O 415 may further include input devices (not illustrated) and output devices 460 that may be included to enhance the transaction experience for persons in the environment. In some embodiments, the terminals 340, personal devices 330, and employee devices 335 of FIG. 3 may include output devices 460, such as visual devices 464 (e.g., visual displays, indicators) and/or audio devices 462 (e.g., speakers) for communicating with persons during their transactions. The output devices 460 may include other devices 466 that provide information to people through tactile feedback (e.g., haptic devices) or using other sensory stimuli. The input devices include suitable devices capable of receiving input from persons, such as cameras, keyboards or keypads, touchscreens, buttons, inertial sensors, etc. I/O 415 may further include wired or wireless connections to an external network (e.g., network 365) using I/O adapter circuitry.

Figure 5:
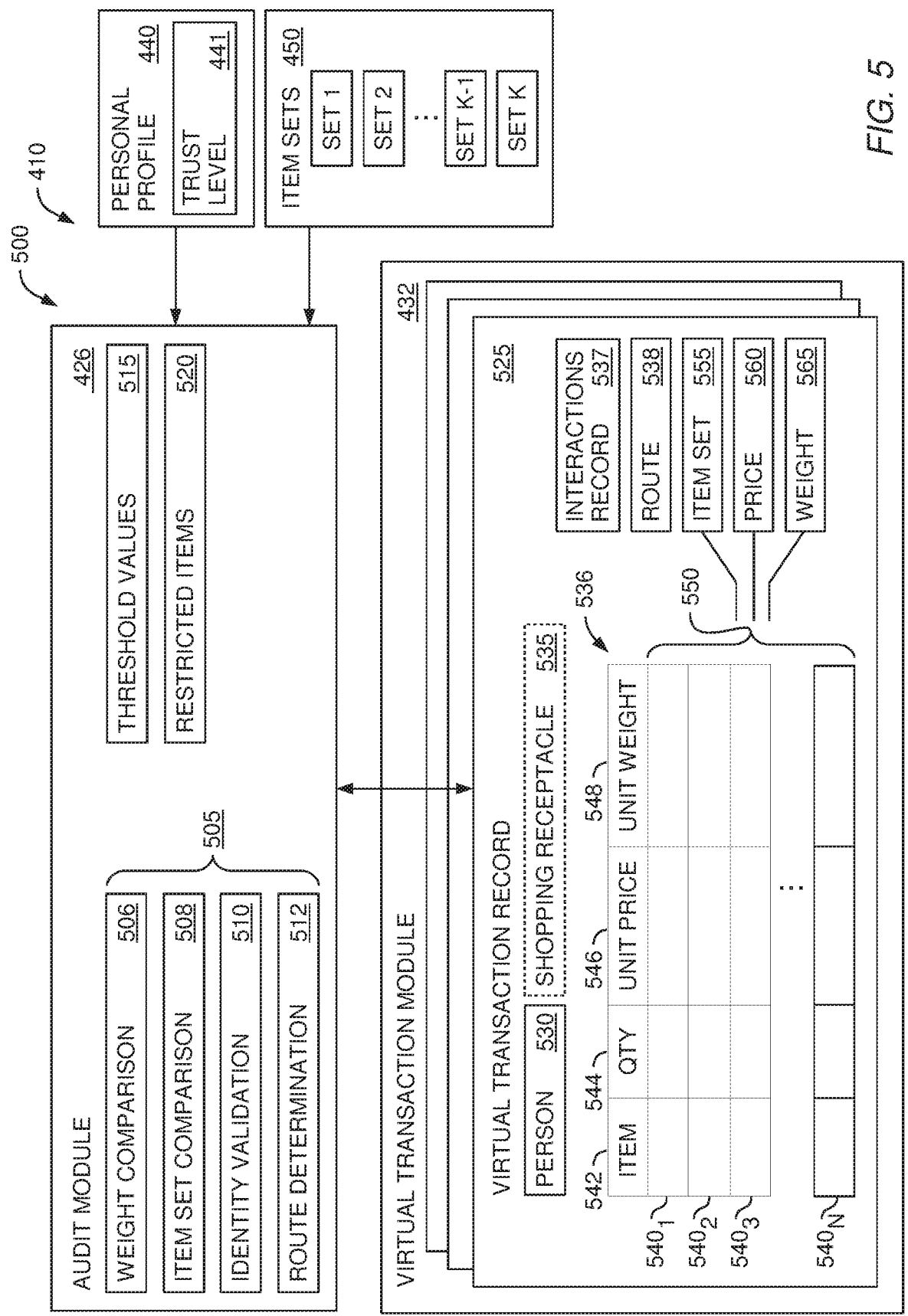
FIG. 5 is a block diagram illustrating operation of an exemplary audit module, according to one embodiment.

The functionality of audit module 426 and virtual transaction module 432 is discussed further with respect to FIG. 5. The item identification module 428 may process image information 445 using known image processing techniques to detect and identify items. Generally, the image information 445 in memory 410 may be acquired using visual sensors of the sensors 445. In some embodiments, identification of the items is performed with respect to a particular shopping receptacle to determine sets of items corresponding to a particular transaction. Item sets 450 are discussed further below. The item identification module 428 may also detect portions of shopping receptacles. In one example, detecting edges of shopping receptacles may be useful to determine whether items are included within or outside the receptacle. In another example, the shopping receptacles may include encoded information, such as a quick response (QR) code, barcode, label, or other information that is used to uniquely identify the receptacle. Detecting the encoded information allows the system to associate the receptacle with the identified items and the particular transaction.

In some embodiments, images for items available in the environment are stored in memory 410, and the item identification module 428 compares acquired image information 445 with the stored images to identify the items within the image information 445. In some embodiments, item identification module 428 may determine properties of items (e.g., size, color, amount of the item that is visible) from the image information 445. The properties may be used to identify items, e.g., where no corresponding stored image is available for comparison.

The person identification module 430 may process image information 445 using known image processing techniques to detect and identify individuals. In some embodiments, the person identification module 430 may perform facial recognition analysis on the image information 445. In some embodiments, the person identification module 430 may determine properties of a person included in the image information 445 (e.g., height, spatial proportions, clothing characteristics). The facial recognition and/or determined properties may be compared with information included in personal profiles 440 to determine whether a suitable match is found. A person may have a photograph of their face or body and/or personal information such as demographic information 442 associated with their personal profile 440. The information and photos may be entered by the person directly, e.g., using a mobile computing device app, and/or determined using data acquired during previous transactions.

Loyalty program module 434 generally administers a loyalty program for the environment, and may provide information to persons in the environment that is based on their personal profiles 440 and/or personal historical data (historical item interactions and purchases, etc.). In one embodiment, the loyalty program module 434 may determine trust levels 441 for different persons, each of which may be stored in the corresponding personal profiles 440. Trust levels 441 may be based on demographic information 442 for the associated person, as well as historical data 443 for the person's previous transactions and interactions in the environment. For example, a teenage customer who in an average transaction spends about $5-10 on junk food items tends to have a trust level much lower than an adult customer who has several children and spends several hundred dollars on groceries during each transaction.

Weighing module 436 receives data from weight sensors 320 in the environment 100 for determining a weight of a shopping receptacle. The weighing module 436 may include logic to determine when to sample the weight data, such as when a threshold weight is crossed, when a visual sensor detects a shopping receptacle in a particular position, and so forth. The shopping receptacle weight may be compared against an estimated weight of the receptacle as part of the audit determination.

FIG. 5 is a block diagram illustrating operation of an exemplary audit module, according to one embodiment. The virtual transaction module 432 maintains and updates virtual transaction records 525 reflecting various interactions of the person with items during transactions in the environment. Virtual transaction records 525 may encompass any suitable scope of activity and/or amount of time. Some examples include a virtual transaction record that encompasses the entire time a person is within the environment (i.e., one record for an entire transaction), virtual transaction records corresponding to the time spent by a person in different departments of the environment (i.e., possibly multiple records for an entire transaction), and so forth.

Each virtual transaction record 525 may be associated with a person 530 and optionally a particular shopping receptacle 535. A virtual transaction record 525 may include a "virtual cart" 536 that maintains an updating listing of items that are expected to be presented by the person during a subsequent checkout transaction. The virtual cart 536 includes a number of item records $540_{1-n}$. Each item record 540 may include an item description 542, a quantity 544, a unit price 546, a unit weight 548, as well as any other suitable information. The virtual cart 536 may be adaptively updated as the person conducts a transaction in the environment. For example, item records 540 may be added or deleted responsive to the person adding or removing items from a shopping receptacle. The items included in the virtual cart 536 (reflected by the combination 550 of the item records 540) may be used to update different variables related to the transaction, such as an item set 555, a total price 560, and a total weight 565. In some embodiments, the weight 565 may be estimated based on stored item data. In other embodiments, a load cell or other weight sensor is disposed within the shopping receptacle and provides updated weight data for the weight 565.

Virtual transaction record 525 may also include an interactions record 537 that includes interactions of the person, which in some cases may not be directly related to a checkout transaction. For example, the interactions record 537 may include field of view information for the person during the transaction (i.e., what items did the person view?) as well as other behavior information—e.g., did the person handle the item, replace the item, perform a predefined gesture, etc. In some embodiments, the interactions record 537 may be used to update the virtual cart 536. For example, the determined interaction of placing an item in a shopping receptacle may trigger an update of the virtual cart, as it is likely that the item will be presented later during a checkout transaction. In some embodiments, the interactions record 537 may be used to determine a route 538 of the person during the transaction, e.g., by corroborating the interactions record 537 with acquired image information including the person. The interactions record 537 may also be useful to determine the person's preferences within the environment, which may be reflected in updates to the personal profile 440.

In some embodiments, the logic used in the audit module 426 may interact with the virtual transaction module 432 and use information maintained in the virtual transaction records 525. The audit module 426 may include a number of sub-modules 505 providing various functionality. Examples of sub-modules 505 include weight comparison 506, item set comparison 508, identity validation 510, and route determination 512. Audit module 426 may include a number of threshold values 515, as well as a list of restricted items 520.

The weight comparison sub-module 506 may be used to compare a weight of the shopping receptacle with an estimated or determined weight 565 included in the virtual transaction record 525. The weight comparison sub-module 506 may communicate with the weighing module 436 (FIG. 4). In some embodiments, when the weight comparison sub-module determines a weight difference greater than an associated threshold value 515, the audit module 426 requires that an audit be performed for the checkout transaction.

The item set comparison sub-module 508 may be used to compare determined item sets 450 with an item set 555 included in the virtual transaction record 525. Item sets 450 are determined using image information captured by visual sensors at various locations throughout the environment. Each item set 450 generally reflects the contents of a shopping receptacle captured at a moment in time, so that a sequence of item sets (Sets 1-K) may be associated with one particular transaction and evaluated to determine progression in item sets over time. As will be described below, the item sets 450 may be determined at various stages of the person's transaction in the environment. In some cases, a last item set 450 may be determined just prior to the person beginning a checkout transaction—such as when the person approaches a checkout area of the environment. Of course, the item sets 450 may be timestamped or otherwise associated with time or ordering information to ensure the correct sequencing of item sets.

Notably, the items included in each item set 450 may represent only a portion of the contents of the shopping receptacle. As the person conducts the transaction and adds items to the shopping receptacle, the added items may form stacks or layers within the receptacle such that certain items are visually obscured and not identifiable in the acquired image information. For example, an overhead visual sensor may acquire image information relating to a top-most layer of items within the shopping receptacle, while any number of items beneath the top layer may also be included in the shopping receptacle.

In some embodiments, the audit module 426 requires that an audit be performed for a checkout transaction when the item set comparison sub-module 508 determines that a group of one or more item sets 450 (i.e., based on image information) does not include at least a threshold value 515 (whether number of items, percentage, etc.) of items in common with the item set 555. In one example, an audit may be triggered where less than 30% of the items included in the virtual transaction record are identified in a most recently determined item set, e.g., using image information from a visual sensor near a checkout area. Of course, other threshold values may be selected. In some embodiments, only the most recent determined item set 450 (e.g., the last item set 450 determined prior to checkout) is compared with the item set 555 of the virtual transaction record. In other embodiments, two or more item sets 450 are compared with item set 555. The two or more item sets 450 may be selected to include the most recent item sets 450, item sets 450 having the largest difference in items (in other words, the selected item sets 450 include a greater number of visually identified items and therefore should have greater overlap with the item set 555 of the virtual transaction record), and so forth.

In some embodiments, the audit module 426 requires an audit of a checkout transaction when at least one of item set 450 and/or the item set 555 include one or more of the restricted items 520, such as age-restricted items like alcohol and tobacco products. In some embodiments, the audit module 426 requires an audit where at least one item set 450 includes a visually identified item that is not included in the item set 555 of the virtual transaction record. For example, the audit selected may be to prompt the person to scan the item in question during the checkout transaction.

In some embodiments, the audit module 426 requires an audit of a checkout transaction when the identity validation sub-module 510 determines that the person beginning (or about to begin) a checkout transaction does not match the person 530 that is associated with the virtual transaction record. Image information (such as facial recognition data) acquired near the checkout area or at a checkout terminal may be compared against stored image information corresponding to the person 530.

In some embodiments, the audit module 426 requires an audit of a checkout transaction based on a route 538 of the person's transaction that is determined by the route determination sub-module 512. The audit module 426 may further base this audit determination on the person's trust level 441. For example, consider a first customer who often transacts in the environment and spends a relatively large amount in an average transaction. A second customer visits the environment infrequently and spends minimal amounts on average. Accordingly, the first customer may have a much greater trust level than the second customer. If the first and second customers walked a same determined route 538 through an area that includes expensive items or otherwise prone to theft, restricted items, items prone to damage, etc. (which may be determined using a planogram or other item location data), the first customer might not be audited while the second customer may be audited.

Figure 6:
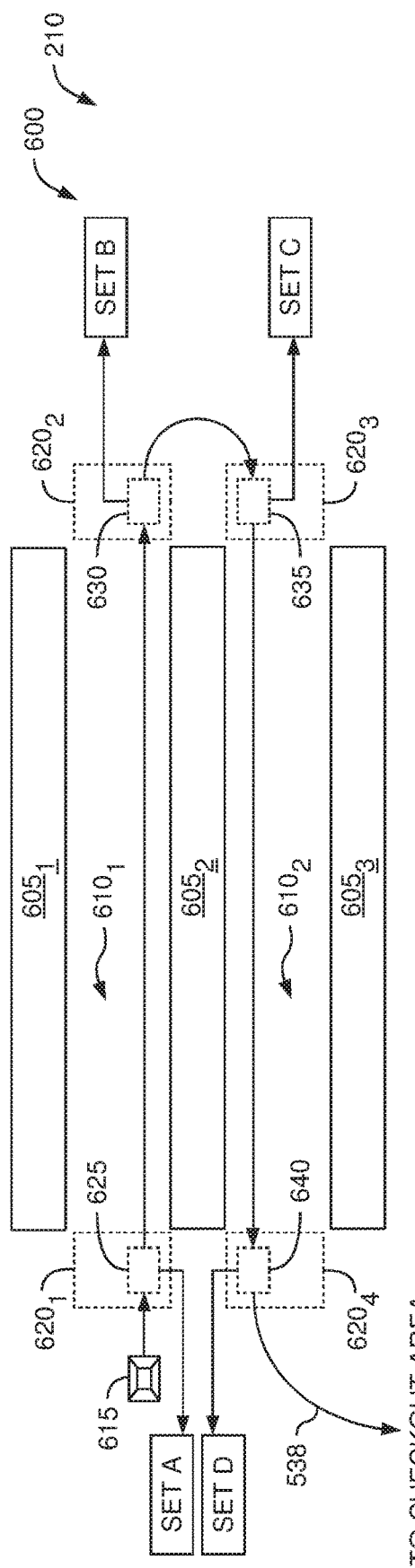
FIG. 6 illustrates acquiring image information along a route of a person through an environment, according to one embodiment.

FIG. 6 illustrates acquiring image information along a route of a person through an environment, according to one embodiment. More specifically, FIG. 6 depicts a top-down view 600 of a portion of the environment—here, a portion of the grocery department 210. The view 600 includes a number of shelving units $605_{1-3}$ that are spatially separated by aisles $610_{1,2}$. The person (not depicted for clarity) associated with the shopping receptacle 615 (e.g., a shopping basket or the basket portion of a shopping cart) walks a route 538 through the grocery department 210. A number of pre-audit areas $620_{1-4}$ are disposed near the entrance/exit of each aisle 610. The pre-audit areas 620 are associated with sensor coverage provided by one or more types of sensors, such as a visual sensor and/or a weight sensor. When the person and the shopping receptacle 615 enter the pre-audit area $620_1$ (shown as receptacle position 625), first image information that includes the shopping receptacle is acquired, and a first item set (Set A) is determined corresponding to that time. As the person exits the aisle $610_1$, he or she enters pre-audit area $620_2$ (receptacle position 630) and second image information is acquired. The second image information is used to determine a second item set (Set B). As the person approaches aisle $610_2$, third image information is acquired at pre-audit area $620_3$ (receptacle position 635) to determine a third item set (Set C). As the person exits aisle $610_2$, fourth image information is acquired at pre-audit area $620_4$ (receptacle position 640) to determine a fourth item set (Set D). Of course, this is merely one implementation of visual sensors capable of acquiring image information to determine item sets. Any number of visual sensors disposed at any suitable locations may alternatively be used to acquire the image information to determine item sets.

Figure 7:
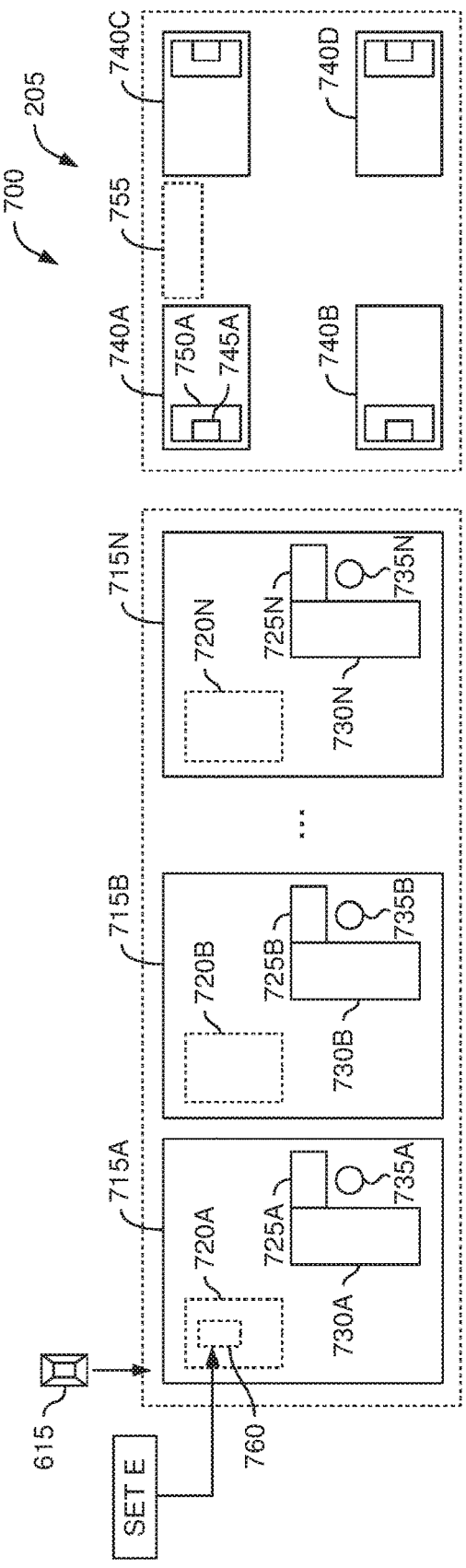
FIG. 7 illustrates exemplary operation of a checkout area, according to one embodiment.

FIG. 7 illustrates exemplary operation of a checkout area, according to one embodiment. More specifically, FIG. 7 depicts a top-down view 700 of a portion of an exemplary checkout area 205. Generally, a person may conclude their transaction in the environment by completing a checkout transaction. The view 700 is one example of a continuation of the route 538 depicted in view 600 of FIG. 6.

The person and shopping receptacle 615 approach the checkout area 205. The checkout area 205 may be subdivided into a first portion 705 including a number of manned checkout lanes 715A-N, and a second portion 710 including a number of self-checkout areas 740A-D. Each manned checkout lane 715 may include a manned checkout terminal 725, a platform 730, and an employee 735. The platform 730 may include conveying, scanning, weighing, and/or bagging portions as would be known to the person of ordinary skill in the art. Each self-checkout area 740 may include a self-checkout terminal 745 and a platform 750 having similar functions.

As the person and shopping receptacle 615 approach the checkout area, or a specific checkout lane or area therein, image information including the receptacle may be acquired. As shown, a predetermined area 720A (corresponding to receptacle position 760) associated with one or more visual sensors may be disposed within a checkout lane 715A, and the acquired image information is used to determine an item set (Set E). A predetermined area may be associated with more than one checkout lane or area, such as the predetermined area 755 disposed within the second portion 710. Alternatively, a predetermined area may be disposed just outside the checkout area 205. In some cases, this item set (Set E) may be the final item set determined for the checkout transaction. The final item set may be compared against the item set from the virtual transaction record to determine whether to audit the checkout transaction. In other cases, an item set may be determined at the checkout terminal, and used in a similar manner for the audit determination.

In some embodiments, the predetermined area 720 or 755 may include a weight sensor for measuring a weight of the shopping receptacle. As discussed above, the weight data may be used as part of the audit determination.

The person may cross the predetermined area 720 or 755 with shopping receptacle 615. Based on the determined item set, a determination is made that no audit is required for the checkout transaction. In some implementations, when the no-audit determination is made, the checkout transaction may be automatically completed (e.g., using a payment method associated with the person's account). The person may continue walking through the checkout area 205 without stopping at a checkout terminal 725, 745. In other implementations, the person may still interact with one of the checkout terminals 725, 745 to complete the checkout (to present payment, to bag items, etc.).

Figure 8:
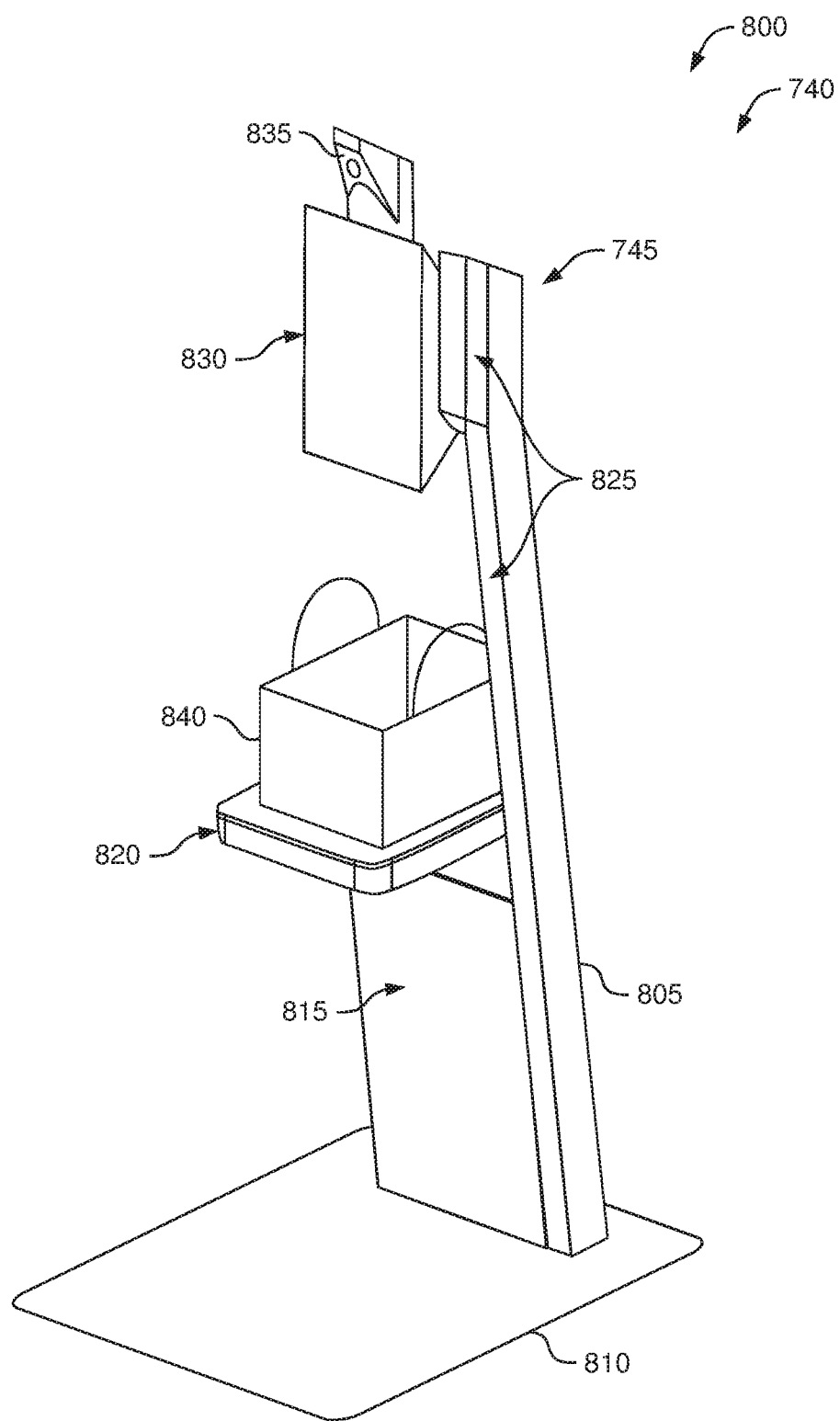
FIG. 8 illustrates an exemplary self-checkout terminal, according to one embodiment.

FIG. 8 illustrates an exemplary self-checkout terminal, according to one embodiment. More specifically, FIG. 8 depicts a projection 800 of a self-checkout area 740 that includes an example self-checkout terminal 745.

The self-checkout terminal 745 includes a base member 810 coupled with one or more vertical structural members 805, 815. The structural members 805, 815 may also be coupled with a platform 820 for supporting a shopping basket 840. In some embodiments, the platform 820 may include one or more weight sensors for weighing the shopping basket 840. Self-checkout terminal 745 includes a visual sensor 835 and a display 830 that are generally oriented toward a person interacting with the terminal. The visual sensor 835 may be configured to capture facial recognition data and/or other image information including the person, e.g., to verify the identity of the person. The self-checkout terminal 745 may include a separate visual sensor (not depicted) configured to acquire image information including the shopping receptacle (e.g., shopping basket 840) to identify items and to determine an item set. Structural member 805 may also include a plurality of indicator lights 825 for communicating with the person and/or with employees.

Figure 9:
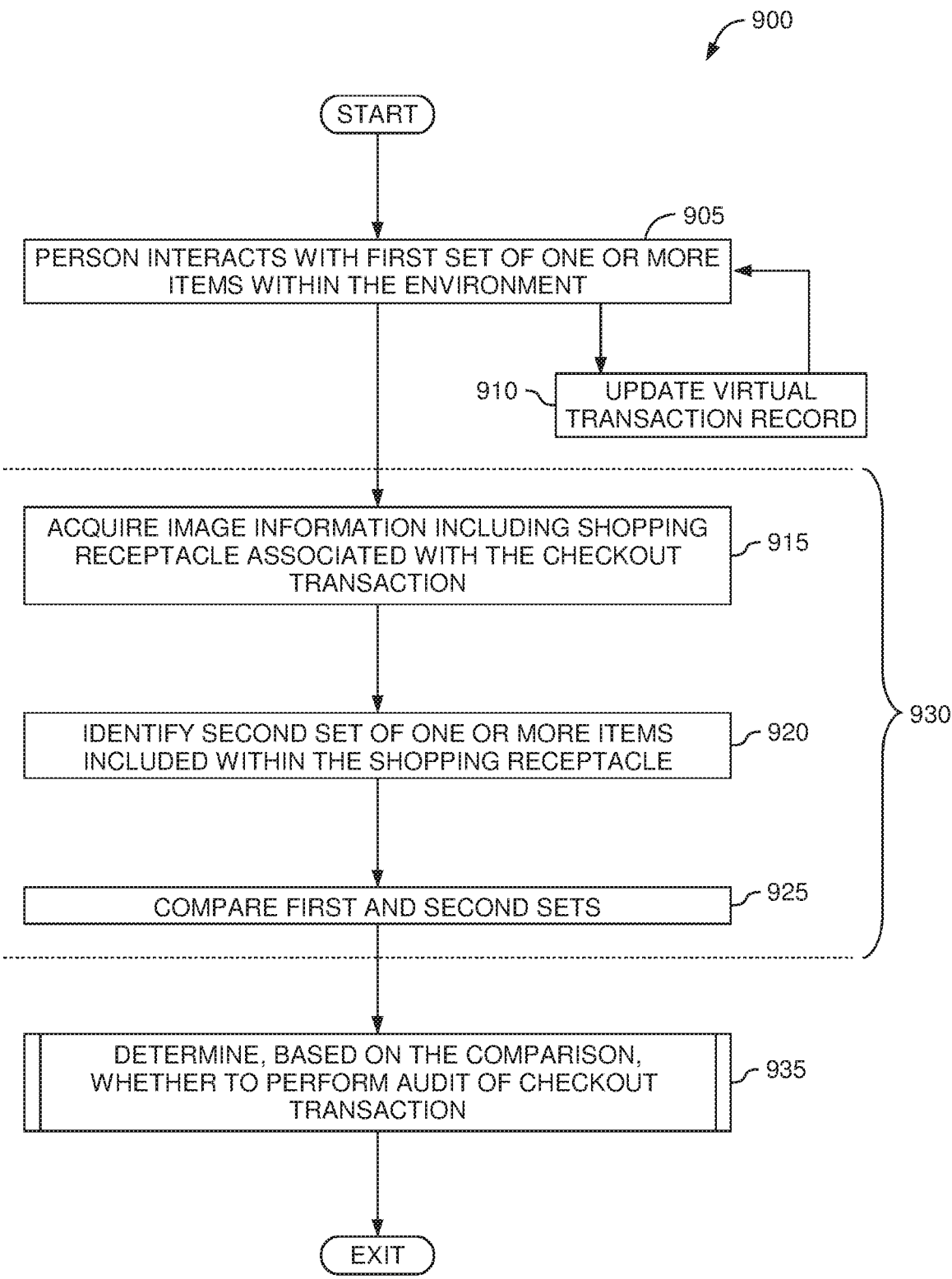
FIG. 9 illustrates a method to facilitate an audit of a checkout transaction within an environment, according to one embodiment.

FIG. 9 illustrates a method to facilitate an audit of a checkout transaction within an environment, according to one embodiment. Method 900 begins at block 905, where the person interacts with a first set of one or more items within the environment as part of a transaction. Generally, the transaction occurs prior to initiating a checkout transaction by approaching a checkout area, approaching a checkout terminal, etc. The interactions with items may be detected using any number of sensor devices in the environment and used to update a virtual transaction record at block 910. Method 900 may cycle between blocks 905 and 910 a number of times during the person's transaction. In some embodiments, a listing of the first set of items may be maintained and updated within the virtual transaction record.

At block 915, image information is acquired that includes the shopping receptacle associated with the checkout transaction. The image information may be acquired at predetermined locations within the environment, such as designated pre-audit areas or at or near a checkout area. In some embodiments, the pre-audit areas may be associated with overhead visual sensors disposed at entrances and/or exits of aisles or other navigable paths in the environment. At block 920, a second set of one or more items included in the shopping receptacle is identified based on the acquired image information. The identification may be performed using any suitable image processing techniques. The second set of items, in many cases, may include only a portion of the items included in the shopping receptacle. In contrast, the first set of items may represent more closely all of the items included in the shopping receptacle.

At block 925, the first and second sets of items are compared. The comparison may identify one or more items that are included in both sets, as well as one or more items that are not common to both sets. The blocks 915-925 may be grouped together as a subroutine 930.

At block 935, and based on the comparison, a determination is made whether to perform an audit of the checkout transaction. In some embodiments, an audit will be performed when the item sets do not a meet a threshold of same items. In some embodiments, an audit will be performed if at least one item is included in the second set that is not included in the first set of items.

Figure 10:
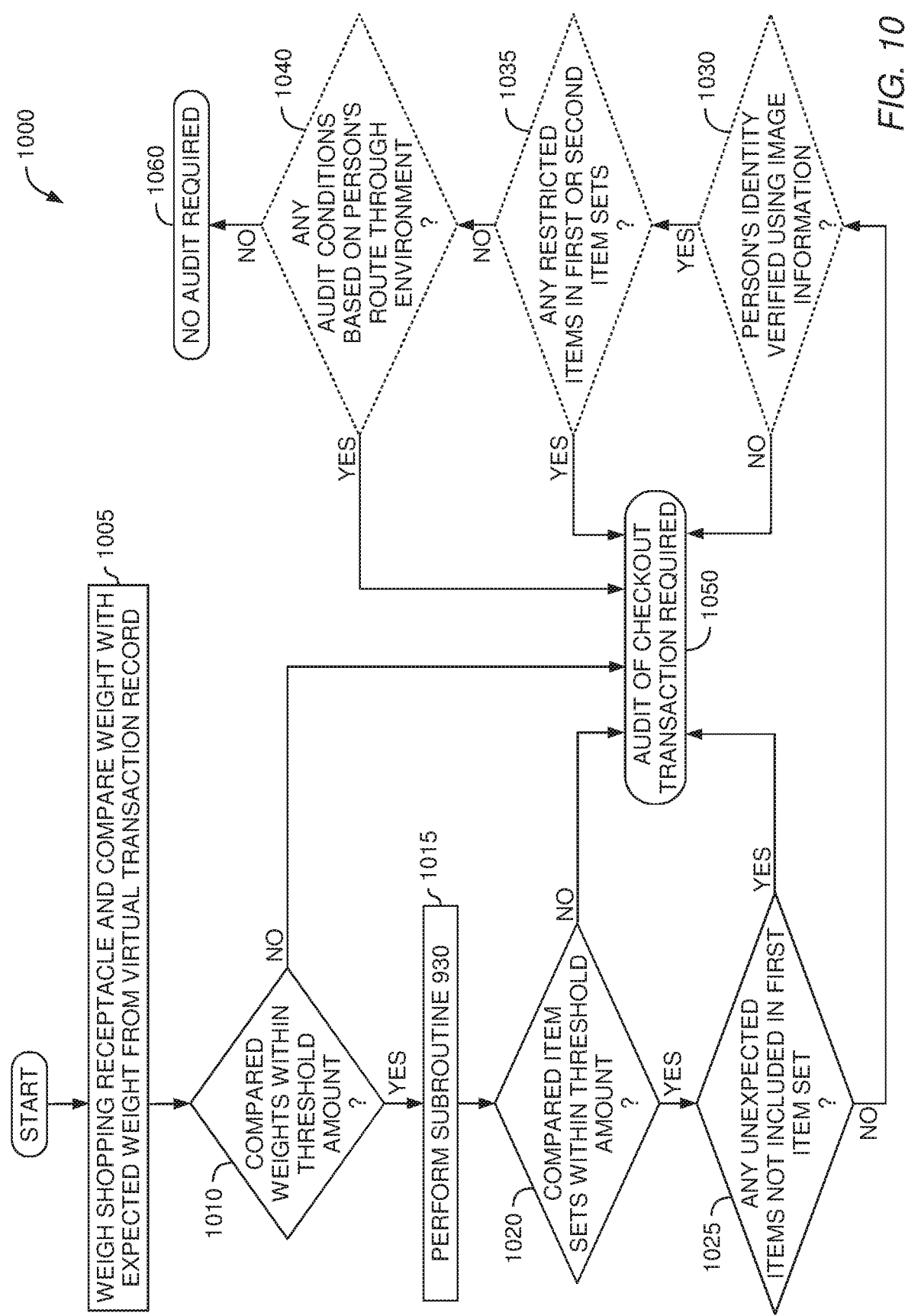
FIG. 10 illustrates an exemplary method to determine whether to perform an audit of a checkout transaction within an environment, according to one embodiment.

FIG. 10 illustrates an exemplary method to determine whether to perform an audit of a checkout transaction within an environment, according to one embodiment. Method 1000 begins at block 1005, where the shopping receptacle is weighed, and the weight compared with an expected weight from the virtual transaction record. Weighing the shopping receptacle may be performed using weight sensors disposed at or near a checkout area, within a checkout terminal, or within the shopping receptacle itself. The expected weight may be derived from an updated item listing in the virtual transaction record and/or stored item data.

At block 1010, the method determines whether the compared weights are within a threshold amount. If the compared weights are sufficiently different ("N"), the method proceeds to block 1050, where an audit of the checkout transaction is required. If sufficiently close ("Y"), the method proceeds to block 1015, where subroutine 930 is performed. At block 1020, the method determines whether compared item sets from subroutine 930 are within a threshold amount. If the compared item sets are sufficiently different ("N"), the method proceeds to block 1050, where an audit of the checkout transaction is required. If sufficiently close ("Y"), the method proceeds to block 1025.

At block 1025, the method determines whether any unexpected items are included in the second item set that are not included in the first item set. If there are any unexpected items ("Y"), the method proceeds to block 1050, where an audit of the checkout transaction is required. If no unexpected items are present ("N"), the method optionally proceeds to block 1030. Alternatively, the method proceeds to block 1060, where no audit of the checkout transaction is required.

At block 1030, the method determines whether the person's identity is verified using acquired image information. The image information may be acquired at a checkout area and/or at a checkout terminal, and may include facial recognition data. If the person is not verified to be the same person as the person associated with the checkout transaction ("N"), the method proceeds to block 1050, where an audit of the checkout transaction is required. If the person's identity is verified ("Y"), the method optionally proceeds to block 1035.

At block 1035, the method determines whether any restricted items are included in the first or second item sets. If any restricted items are included ("Y"), the method proceeds to block 1050, where an audit of the checkout transaction is required. If no restricted items are included ("N"), the method optionally proceeds to block 1040.

At block 1040, the method determines whether any audit conditions exist based on the person's determined route through the environment. In some embodiments, the audit conditions may further be based on the trust level associated with the person. If any audit conditions exist ("Y"), the method proceeds to block 1050, where an audit of the checkout transaction is required. If no audit conditions exist ("N"), the method proceeds to block 1060, where no audit of the checkout transaction is required.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to facilitate an audit of a checkout transaction within an environment having a plurality of items selectable by a person, the method comprising:
   determining, independent of the checkout transaction, a threshold parameter for comparing a plurality of item sets, wherein each of the plurality of item sets identifies one or more items from the plurality of items;
   acquiring, by one or more first visual sensors within the environment, first image information including information about interactions of the person with a first item set of the plurality of item sets;
   acquiring, by one or more second visual sensors that are oriented toward a predetermined location within the environment, second image information including information about a receptacle associated with the checkout transaction;
   performing, by one or more computer processors, processing on the second image information to identify one or more items that are included in the receptacle as a second item set of the plurality of item sets;
   determining whether a comparison of the first item set and the second item set meets the threshold parameter by having at least a threshold number of items in common; and
   responsive to determining that the first item set and the second item set do not include at least the threshold number of items in common, communicating by one or more computer processors to prescribe one or more actions to be performed in the audit of the checkout transaction.

2. The method of claim 1, further comprising:
   maintaining, by the one or more computer processors, a virtual transaction record associated with the person to reflect the interactions of the person with the one or more items identified in the first item set.

3. The method of claim 1, wherein the one or more second visual sensors are disposed at a checkout area of the environment.

4. The method of claim 1, further comprising:
   displaying the prescribed one or more actions using a visual display communicatively coupled with the one or more computer processors.

5. The method of claim 1, wherein the threshold parameter is specified as a percentage of items included in one of the first item set and the second item set.

6. The method of claim 1, wherein the second item set is a most-recently determined item set prior to the checkout transaction.

7. The method of claim 1, wherein at least one of the first item set and the second item set is selected to provide a largest difference in items between the first item set and the second item set.

8. A computer program product to facilitate an audit of a checkout transaction within an environment having a plurality of items selectable by a person, the computer program product comprising:
   a computer-readable storage medium having computer-readable program code embodied therewith, the computer-readable program code executable by one or more computer processors to perform an operation comprising:

determining, independent of the checkout transaction, a threshold parameter for comparing a plurality of item sets, wherein each of the plurality of item sets identifies one or more items from the plurality of items;

acquiring, by one or more first visual sensors within the environment, first image information including information about interactions of the person with a first item set of the plurality of item sets;

acquiring, by one or more second visual sensors that are oriented toward a predetermined location within the environment, second image information including information about a receptacle associated with the checkout transaction;

performing, by the one or more computer processors, processing on the second image information to identify one or more items that are included in the receptacle as a second item set of the plurality of item sets;

determining whether a comparison of the first item set and the second item set meets the threshold parameter by having at least a threshold number of items in common; and responsive to determining that the first item set and the second item set do not include at least the threshold number of items in common, communicating by one or more computer processors to prescribe one or more actions to be performed in the audit of the checkout transaction.

9. The computer program product of claim 8, the operation further comprising:

maintaining, by the one or more computer processors, a virtual transaction record associated with the person to reflect the interactions of the person with the one or more items identified in the first item set.

10. The computer program product of claim 8, wherein the one or more second visual sensors are disposed at a checkout area of the environment.

11. The computer program product of claim 8, the operation further comprising:

displaying the prescribed one or more actions using a visual display communicatively coupled with the one or more computer processors.

12. The computer program product of claim 8, wherein the threshold parameter is specified as a percentage of items included in one of the first item set and the second item set.

13. The computer program product of claim 8, wherein the second item set is a most-recently determined item set prior to the checkout transaction.

14. The computer program product of claim 8, wherein at least one of the first item set and the second item set is selected to provide a largest difference in items between the first item set and the second item set.

15. A system to facilitate an audit of a checkout transaction within an environment having a plurality of items selectable by a person, the system comprising:

one or more computer processors;

one or more first visual sensors and one or more second visual sensors disposed within the environment and communicatively coupled with the one or more computer processors; and a memory containing program code which, when executed by the one or more computer processors, performs an operation comprising:

determining, independent of the checkout transaction, a threshold parameter for comparing a plurality of item sets, wherein each of the plurality of item sets identifies one or more items from the plurality of items;

acquiring, by the one or more first visual sensors, first image information including information about interactions of the person with a first item set of the plurality of item sets;

acquiring, by the one or more second visual sensors, second image information including information about a receptacle associated with the checkout transaction, wherein the one or more second visual sensors are oriented toward a predetermined location within the environment;

performing, by the one or more computer processors, processing on the second image information to identify one or more items that are included in the receptacle as a second item set of the plurality of item sets;

determining whether a comparison of the first item set and the second item set meets the threshold parameter by having at least a threshold number of items in common; and responsive to determining that the first item set and the second item set do not include at least the threshold number of items in common, communicating by one or more computer processors to prescribe one or more actions to be performed in the audit of the checkout transaction.

16. The system of claim 15, the operation further comprising:

maintaining, by the one or more computer processors, a virtual transaction record associated with the person to reflect the interactions of the person with the one or more items identified in the first item set.

17. The system of claim 15, wherein the one or more second visual sensors are disposed at a checkout area of the environment.

18. The system of claim 15, the operation further comprising:

displaying the prescribed one or more actions using a visual display communicatively coupled with the one or more computer processors.

19. The system of claim 15, wherein the threshold parameter is specified as a percentage of items included in one of the first item set and the second item set.

20. The system of claim 15, wherein the second item set is a most-recently determined item set prior to the checkout transaction.

* * * * *